United States Patent
Kim et al.

(10) Patent No.: US 7,142,897 B2
(45) Date of Patent: Nov. 28, 2006

(54) PORTABLE TERMINAL

(75) Inventors: Suk-Soon Kim, Suwon-shi (KR); Woo-Yong Lee, Koyang-shi (KR); Soon-Jung Lee, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 483 days.

(21) Appl. No.: 10/414,169

(22) Filed: Apr. 15, 2003

(65) Prior Publication Data
US 2004/0116163 A1 Jun. 17, 2004

(30) Foreign Application Priority Data
Dec. 16, 2002 (KR) .................. 10-2002-0080318

(51) Int. Cl.
*H04B 1/38* (2006.01)
*H04M 1/00* (2006.01)

(52) U.S. Cl. ............... 455/575.1; 455/575.6; 455/127.1; 455/556.1; 455/557; 455/67.14; 455/572; 455/573; 327/530; 310/89; 310/322; 310/324

(58) Field of Classification Search ........... 455/557, 455/556.1, 575.6, 67.14, 127.1, 572, 573
See application file for complete search history.

(56) References Cited

U.S. PATENT DOCUMENTS

| | | | | |
|---|---|---|---|---|
| 5,887,244 A | * | 3/1999 | Aldridge et al. | 455/67.14 |
| 5,895,431 A | * | 4/1999 | Miller et al. | 701/1 |
| 5,898,905 A | * | 4/1999 | Aldridge et al. | 455/67.14 |
| 5,923,735 A | * | 7/1999 | Swartz et al. | 379/93.12 |
| 6,434,395 B1 | * | 8/2002 | Lubin et al. | 455/466 |
| 6,463,271 B1 | * | 10/2002 | Schroeder et al. | 455/561 |
| 6,477,383 B1 | * | 11/2002 | Jyogataki et al. | 455/466 |
| 6,594,363 B1 | * | 7/2003 | Kim | 381/58 |
| 6,876,863 B1 | * | 4/2005 | Schroeder et al. | 455/466 |

FOREIGN PATENT DOCUMENTS

KR 2000-0013497 7/2000

\* cited by examiner

*Primary Examiner*—Marceau Milord
(74) *Attorney, Agent, or Firm*—Dilworth & Barrese LLP

(57) ABSTRACT

Disclosed is a portable terminal that includes an external device interface unit, a memory unit, a main controller, and a power supply unit. The external device interface unit provides a connection between the portable terminal and an external device, includes ports outputting control signals and electric power for operating the external device, and controls an operation of the external device. The memory unit stores downloaded information for operating the external device that is connected to the portable terminal through the external device interface unit. The main controller generates an external device control signal based on the operation information stored in the memory unit, and transmits the external device control signal to the external device interface unit. The power supply unit provides power for driving the external device through the external device interface unit.

12 Claims, 9 Drawing Sheets

PORTABLE TERMINAL

PRIORITY

This application claims priority to an application entitled "PORTABLE TERMINAL", filed in the Korean Industrial Property Office on Dec. 16, 2002 and assigned Serial No. 2002-80318, the contents of which are incorporated herein by reference.

BACKGROUND OF THE INVENTION

1. Field of the Invention

The present invention relates to a portable terminal, and more particularly to a portable terminal wherein an external device is connected to the portable terminal to allow a user to more conveniently extend functions of the terminal, and includes an interface unit for controlling the external device.

2. Description of the Related Art

Recently, in line with the development of mobile communication technologies, portable terminals are widely used to receive mobile communication services. However, all terminals commercialized up to now incorporate the same operation pattern if they have the same model name. For example, if an incoming call is received, a terminal commonly blinks an LED (Light Emitting Diode) for a predetermined time while outputting a bell sound.

However, users are bored with the monotonous shape, function, and external functional components of the portable terminals. Thus, it is recently popular among portable terminal users to alter the configuration of the terminal for achieving their unique and creative shapes, functions, and external functional components.

Generally, users use an electrical sound signal of a speaker and a control signal of an LED as an input signal so as to alter the configuration of the terminals.

In terminals commercialized up to now, there is no way for users to modify peripheral device operations, pursuant to the specifications and fixed functions provided by manufacturers. Thus, in order to apply an additional LED or other optional functions to a model of the portable terminal currently on the market, it is necessary for users to disassemble the portable terminal and hardwire a lead line thereto.

FIG. 1A is a functional block diagram showing the conventional portable terminal.

Referring to FIG. 1A, the conventional portable terminal includes a modem CPU (Modulator and Demodulator Central Processing Unit) 10, a power supply unit 20, a device controller 30, a memory 40, and devices 50. Devices 50 may include more than one device. Here, explanations of a display unit, an LED and speaker controller, and a transmitter/receiver that are usually included in portable communication devices are omitted.

The device controller 30 controls the operation of the devices 50 based on a control signal that is generated from the modem CPU 10 by a control program stored in the memory 40. The modem CPU 10 and the device controller 30 are driven by electric power fed from the power supply unit 20.

The devices 50 refer to a predetermined number of fixed devices externally or internally mounted on a terminal currently on the market.

FIG. 1B is an exemplary view showing the structure of a pin for controlling the devices in the portable terminal of the prior art.

Referring to FIG. 1B, the modem CPU 10 outputs a predetermined number (n) of control signals (GPIO #1~GPIO #n: General_Purpose-Input_Output #1~General_Purpose-Input_Output #n) for controlling the predetermined number (n) of devices. Each of the control signals (GPIO #1~GPIO #n) is used for controlling each of the devices mounted on the portable terminal such as an LED and a backlight.

Particularly, FIG. 1B illustrates, as an example, the structure for controlling the operation of an LED 51 by a control signal GIPO #1. Referring to FIG. 1B, the LED 51 is controlled by an npn transistor 31 and a resistor 33. Being operated by the control signal GPIO #1 outputted from the modem CPU 10, the transistor 31 applies a voltage Vcc to the LED 51. The resistor 33 adjusts the brightness of the LED 51. For example, in the case where the control signal GPIO #1 is set to have a signal level 'h' at a time when the portable terminal receives an incoming call signal, the control signal GPIO #1 enables the transistor to be activated when the portable terminal actually receives an incoming call signal. On the other hand, the LED 51 emits a relatively dim light when the resistor 33 has a higher resistance value, whereas the LED 51 emits a relatively bright light when the resistor 33 has a lower resistance value.

In order to add an LED to the portable terminal of the prior art, as mentioned above, it is necessary to disassemble the portable terminal, find an available signal line, and hardwire a lead line at a position of the signal line where the LED will be connected. For example, in order to add a separate LED that has the same operation characteristics as the LED 51, it is necessary to additionally connect a lead line between the LED 51 and the resistor 33 before adding the separate LED.

It is not easy for a general person, not skilled in handling electrical devices, to perform such a work. Even if a new LED has been added in such a manner, the newly added LED has the same operation properties as an inherent LED (for example, the LED 51 of FIG. 1A) that is originally mounted on the terminal. This is because there is no way to alter a program of controlling an LED of the terminal.

As mentioned above, in the prior art, there is no way for users to easily alter the configuration of the portable terminal. Further, even if the configuration of the terminal has been altered, there is no method to alter its function in various ways.

SUMMARY OF THE INVENTION

Therefore, the present invention has been made in view of the above problems, and it is an object of the present invention to provide a portable terminal which enables users to alter the configuration of the portable terminal and alter its function in various ways.

It is another object of the present invention to provide a portable terminal wherein an external device is connected to the portable terminal, and an interface unit for controlling the external device is provided so as to allow external hardware extensions of the terminal.

In accordance with the present invention, the above and other objects can be accomplished by the provision of a portable terminal comprisingan external device interface unit which provides a connection between the portable terminal and an external device, includes ports outputting control signals and electric power for operating the external device, and controls an operation of the external device; a memory unit for storing information for operating the external device, which is connected to the portable terminal through the external device interface unit, the information being downloaded from an external site; a main controller for generating an external device control signal based on the operation information stored in the memory unit, and transmitting the external device control signal to the external device interface unit; and a power supply unit for providing power for driving the external device through the external device interface unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1A:
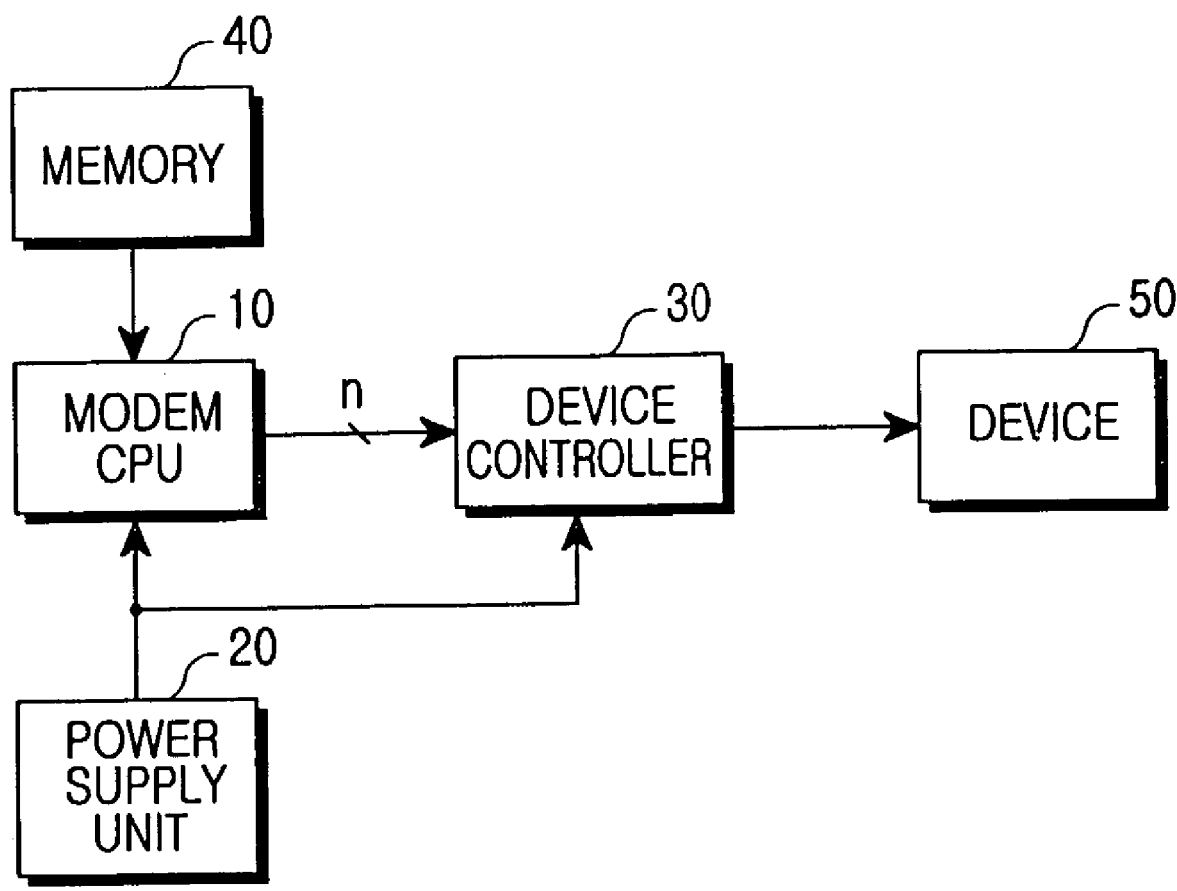
FIG. 1A is a functional block diagram showing the conventional portable terminal.
Figure 1B:
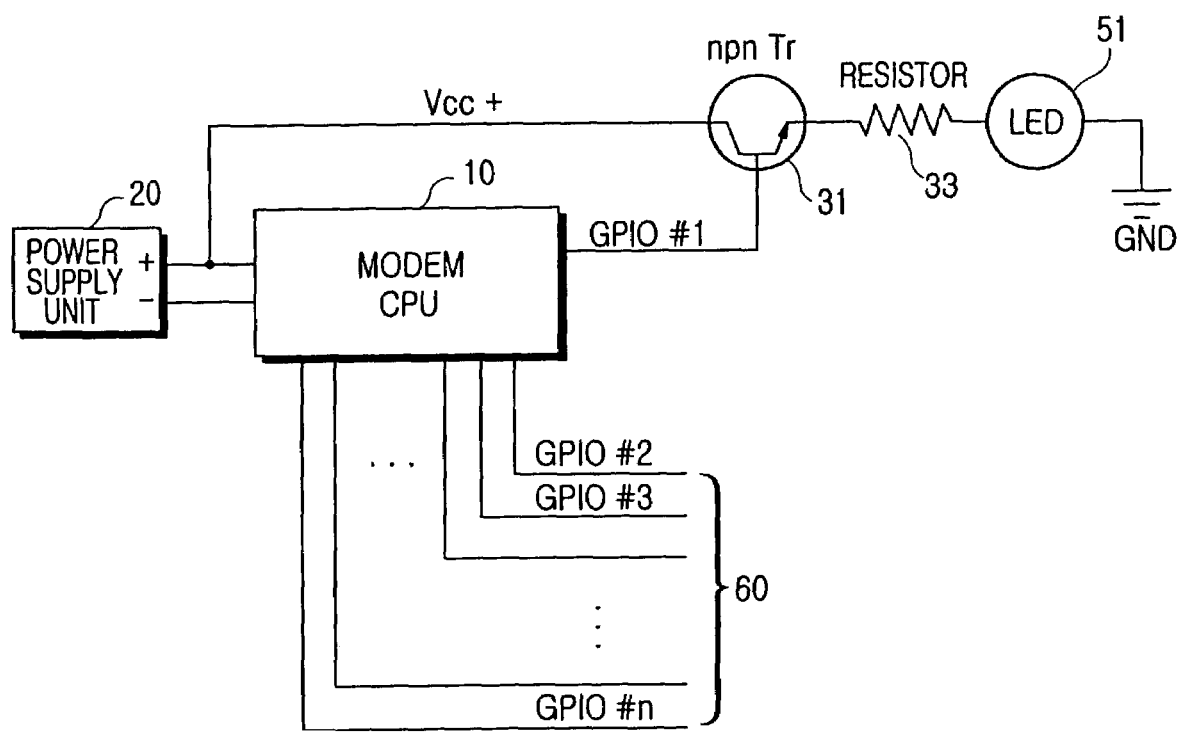
FIG. 1B is an exemplary view showing the structure of a device control pin in the conventional portable terminal.

Now, preferred embodiments of the present invention will be described in detail with reference to the annexed drawings. In the drawings, the same or similar elements are denoted by the same reference numerals even though they are depicted in different drawings. Although a number of specific configurations such as complicated circuit elements are described in the following description, such a description is provided only for the sake of an overall understanding of the present invention, and those skilled in the art will appreciate that the present invention can be carried out without being limited to such specific configurations. In the following description, a detailed description of known functions and configurations incorporated herein will be omitted when it may obscure the subject matter of the present invention rather unclear.

Figure 2A:
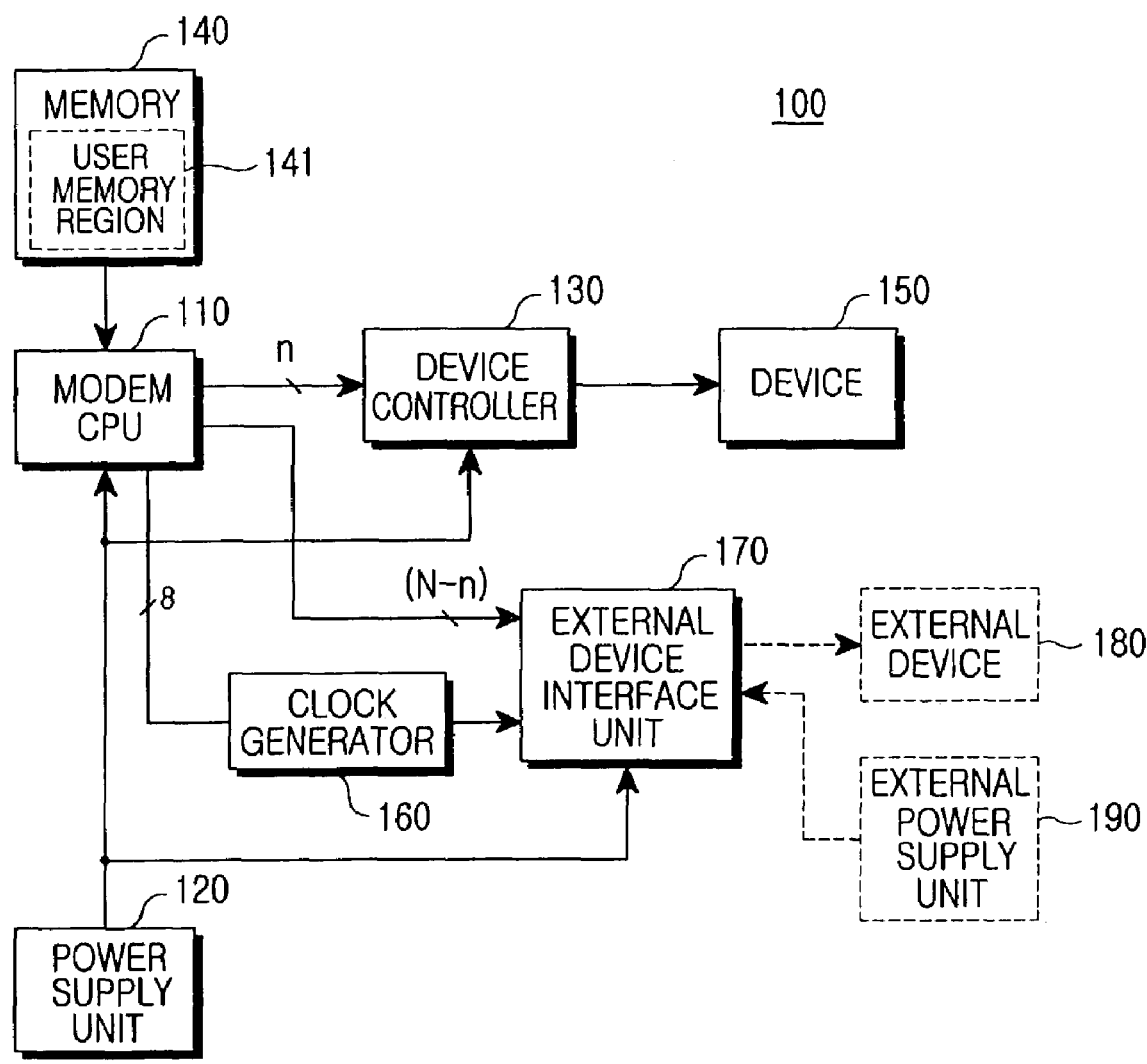
FIG. 2A is a schematic functional block diagram showing the configuration of a portable terminal according to an embodiment of the present invention.

FIG. 2A is a block diagram showing the configuration of a portable terminal according to an embodiment of the present invention.

Referring to FIG. 2A, the portable terminal 100 according to the embodiment includes a modem CPU 110, a power supply unit 120, a device controller 130, a memory 140, a device 150, an external device interface unit 170, and a clock generator 160. Here, explanations of a display unit, an LED and speaker controller, and a transmitter/receiver that are usually included in portable communication devices are omitted.

The modem CPU 110 controls the operation of the portable terminal 100. The devices 150 are mounted on the interior or exterior of the terminal 100 to perform their unique operations according to an operation rule set to each of the devices.

The memory 140 stores/manages the operation rule of each device. In the case where the device is an LED, the memory 140 stores/manages an operation rule determined at a time when the terminal is manufactured, for example, an operation rule that, upon receipt of an incoming call signal, the LED blinks at predetermined intervals.

The device controller 130 controls the operation of the devices 150 based on control signals generated from the modem CPU 110. The modem CPU 110 generates device control signals based on the operation rule of each device and outputs it to the device controller 130.

The external device interface unit 170 provides a connection between an external device 180 to the portable terminal 100, and includes ports through which control signals for controlling the external device 180 are outputted.

The clock generator 160 receives a 8-bit data signal from the modem CPU to generate a clock, and then outputs the clock to the external device 180 interface unit 170. This is to provide a clock to the external device 180 in the case where the external device 180, connected to the external device interface unit 170, is a device requiring a clock. External devices 1.80 requiring clocks are, for example, a sound generator (or a stereo codec), an LCD (Liquid Crystal Display), and a memory. Regarding the external device 180 requiring a clock, the clock functions as its driving engine. For example, there are a number of kinds of clocks necessary for the sound generator such as 13.5 MHz, 15.3 MHz, 19.5 MHz, 27 MHz. The kind of the clock varies depending on the kind of the device and the manufacturer.

On the other hand, the portable terminal 100 requires a user memory region that stores/manages operation information that is used for controlling the operation of each of the external devices 180. The user memory region can be implemented by providing a separate memory, or by allocating a predetermined region of an existing memory as the user memory region, so that the predetermined region is accessible by users. In FIG. 2A, it is shown as an example that a predetermined region of the memory 140 is assigned as a user memory region 141.

The operation information on the external devices 180 is downloaded from an external site (e.g., a website) and stored in the user memory region 141. Users can receive the operation information using a software tool such as a PC_Link which enables the users to input desired information. That is, a user can obtain the operation information in such a manner that the user gains access to a website providing such a software tool, and, after defining the operation rule of the external device 180 and corresponding control signals of the external device 180, the user downloads the defined data, related on the operation of the external device 180, to the user memory region 141 through a predetermined I/O terminal of the portable terminal, such as a data cable port, an USB port, etc.

The operation information of the external devices 180 stored in the user memory region 141 may include information such as the GPIO mode (an input or output GPIO mode), the timing of operating the external device 180, the on/off intervals of GPIOs, cycle times of repeating the operation, the kinds of clocks (1 kHz, 2 kHz, 3 kHz, . . . ), and the kinds of operating voltages (1V, 2V, 3V, . . . ).

The operating timing may be assigned to each of all detectable operating states in the portable terminal, such as an alarm operating state, a wake-up called state, and a data service receiving/transmitting state, and a standby state, a calling state, an incoming voice-call reception, and an outgoing voice-call origination.

The modem CPU 110 generates control signals for the external device 180 based on the operation information stored in the user memory region 141, and transmits it to the interface unit 170.

The power supply unit 120 supplies electrical power to the modem CPU 120, the device controller 130 and the external device interface 170, so as to drive the device 150 and the external device 180, respectively. Here, it is noted that original operations of the portable terminal 100 such as the reception or transmission of voice signals may be degraded because the power supply unit 120 also supplies electrical power for driving the external device 180. In order to avoid such a problem, an external power supply unit 190 may be connected to the external device interface 170. In this case, it is necessary to connect the ground line of the external power supply unit 190 to the ground line of the power supply unit 120, so as to equalize both the electric signal references.

Figure 2B:
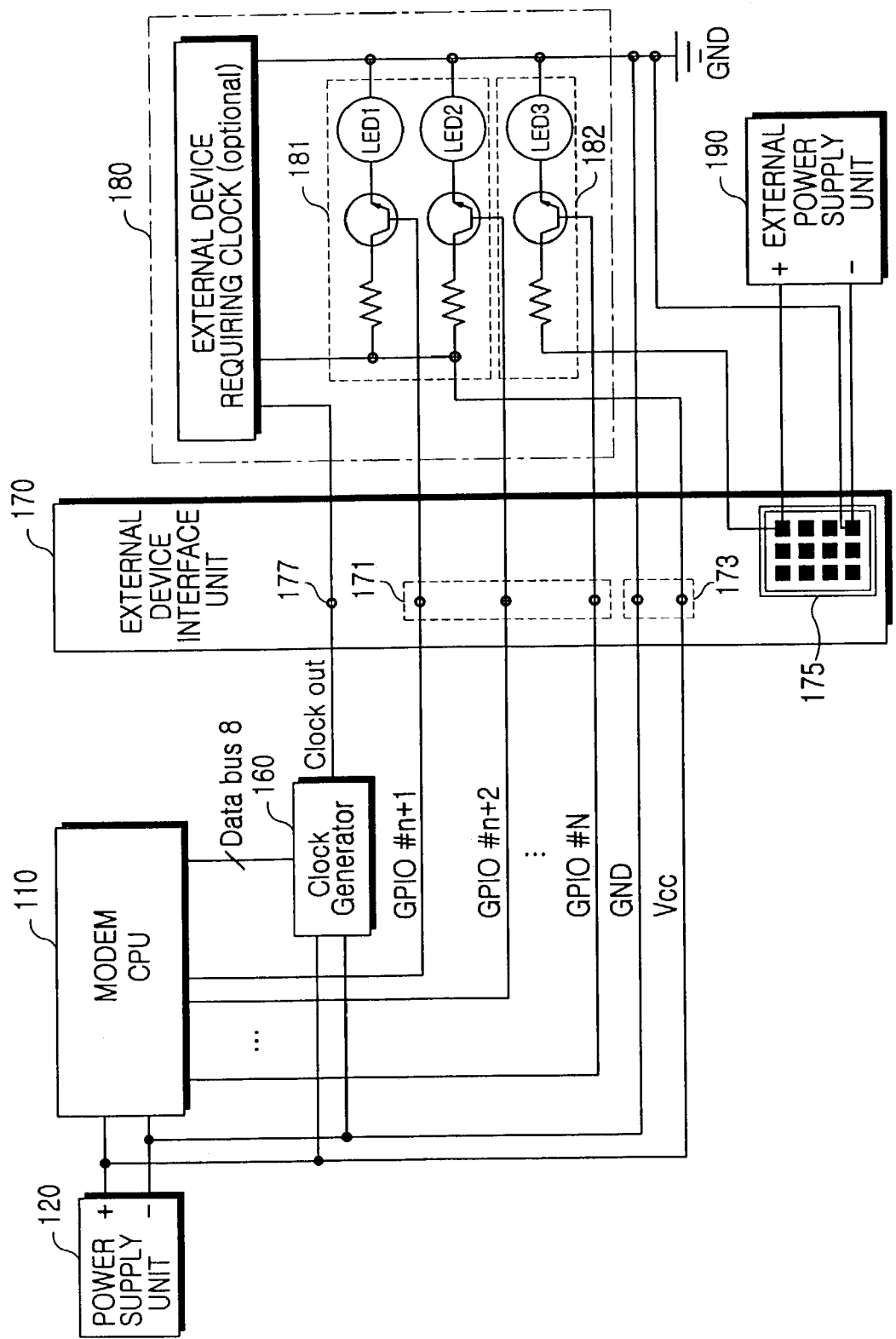
FIG. 2B is an exemplary view showing the connection configuration and the structure of an external device interface unit according to the embodiment of the present invention.

FIG. 2B is a view showing the connection configuration and the structure of the external device interface unit in the portable terminal according to the embodiment of the present invention. This figure does not show a predetermined number (n) of control signals (GPIO #1~GPIO #), which are used for controlling the predetermined number (n) of fixed devices, of a number of control signals outputted from the modem CPU 110. This is because the portions not shown are similar to those of the prior art, which are well known in the art.

Referring to FIG. 2B, the external device interface unit 170 includes a number of control ports 171, a power supply port 173, a pad portion 175, and a clock port 177. Signals for controlling the external device 180 are outputted through the control ports 171. The power supply port is connected to the power supply unit 120 in order to supply electrical power to the external device 180. The external device 180 is mounted on the pad portion 175. The clock port provides a clock to an external device 180 requiring the clock.

The control ports 171 are connected to a predetermined number (N-n) of control signals (GPIO #(n+1)~GPIO #N) outputted from the modem CPU 110. The power supply port 173 is connected to the ground GND and voltage Vcc of the power supply unit 120. The clock port 177 is connected to the output terminal of the clock generator 160 and the external device 180 requiring the clock.

The chip manufacturer fabricates the modem CPU 110 so that it provides several GPIO signals to several tens of GPIO signals to be used for developers. The present invention utilizes such GPIO signals for developers. However, in the case of a Qualcomm's chip (MSM xxx) usually used in a portable terminal, there are few GPIO signals, other than control signals (GPIO #1~GPIO #n) for essential devices. That is, there are few remaining GPIO signals to be provided to the external interface unit. Thus, it is necessary to split or extend the remaining GPIO signals into a number of GIPO signals. The same method as disclosed in Korean utility model publication No. 2000-0013497 (Application No. U19980026669) may be used to extend the remaining GIPO signals.

The pad portion 175 has such a configuration that a predetermined number of conducting grooves are formed on one surface of the pad portion 175, and the other surface provides essential connections such as ground and power supply connections. The configuration of the pad portion 175 enables users to easily mount external devices, such as a resistor and an LED, on the portable terminal according to the users' desires. Such a configuration of the pad portion 175 is well known in the field of electric circuit designs, and a further detailed description is omitted.

FIG. 2B shows, as an example, that the external power supply unit 190 is connected to the pad portion in order to compensate for reduction of available electric power from the power supply unit 120 which is caused by adding the external device 180. Referring to FIG. 2B, the external device 180 is designed in such a manner that a portion 181 of the external device 180 is driven by electric power from the power supply unit 120, and another portion 182 is driven by electric power from the external supply unit 190.

It is necessary to design the external power supply unit 190 and the power supply unit 120 so that they share a common ground in order to provide the synchronized signal (e.g., the same electrical signal reference).

In FIG. 2B, it is shown, as an example, that a control signal GPIO #n+1 is used for controlling an LED1, and a control signal GPIO #n+2 is used for controlling an LED2. That is, a resistor and a transistor are connected to the front end of each of the LED1 and LED2, so that the LED1 and LED2 are controlled by the control signals GPIO #n+1 and GPIO #n+2, respectively. The transistors are activated by the control signals GPIO #n+1 and GPIO #n+2 to apply power supply voltage (Vcc) to each of the LED1 and LED2, while the resistors connected to the front ends of the transistors are used for controlling the brightness of the LED1 and LED2, respectively. For example, in the case where the control signals GPIO #n+1 and GPIO #n+2 are set to have a signal level 'h' at a time when the portable terminal receives an incoming call signal, the control signals GPIO #n+1 and GPIO #n+2 activate the corresponding transistors to turn on the LED1 and LED2, respectively, when the portable terminal actually receives an incoming call signal. As the resistor connected to the front end of the transistor has a higher resistance value, a smaller amount of power is supplied to the transistor. Accordingly, the LED1 and LED2 emit a relatively dim light when the resistors have a higher resistance value, whereas the LED1 and LED2 emit a relatively bright light when the resistors have a lower resistance value. Users define the operating rules of the control signals GPIO #n+1 and GPIO #n+2 by using a separate software tool (e.g., PC-Link).

Figure 3A:
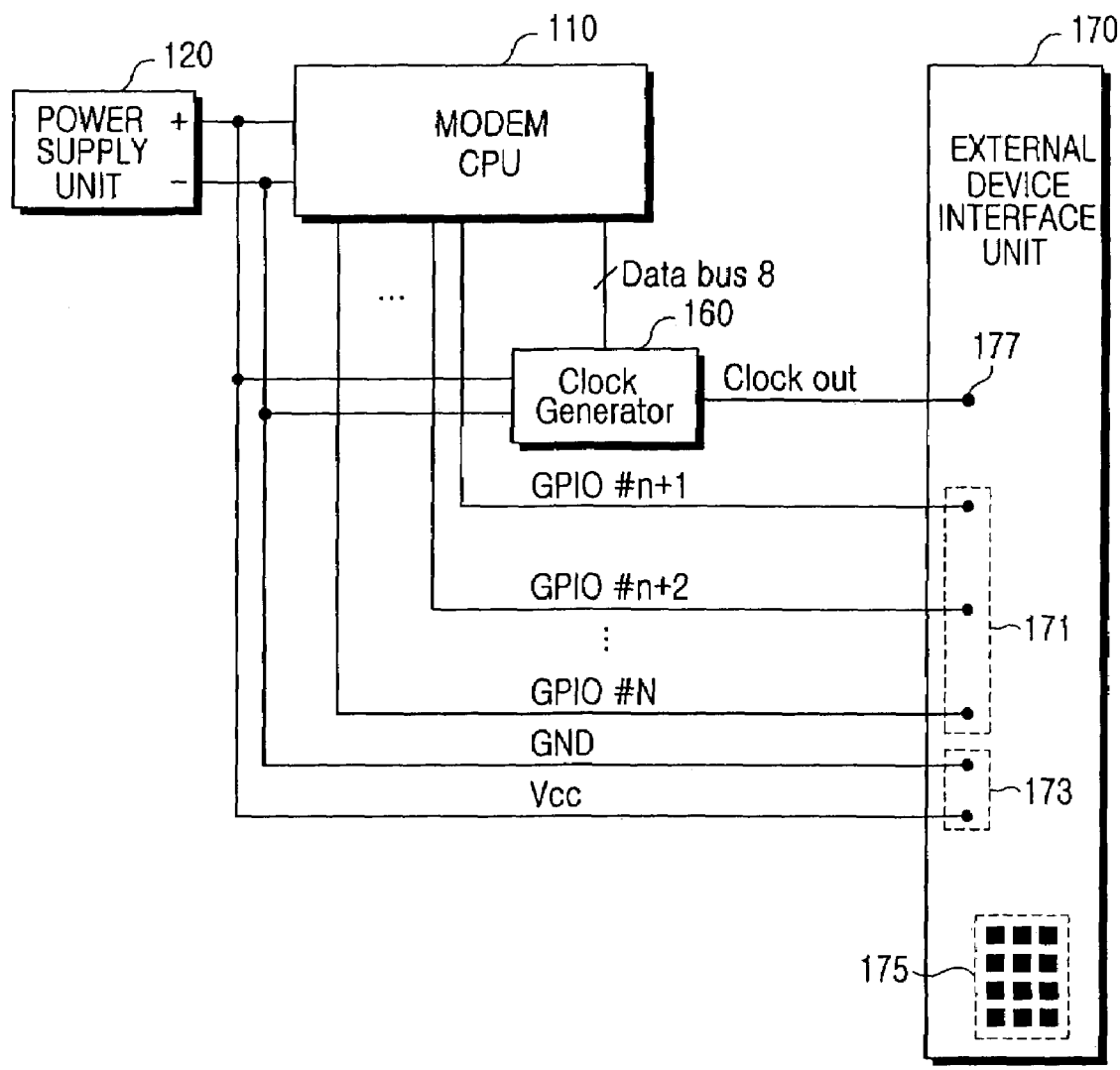
FIGS. 3A to 3C are views examples of the external device interface unit according to the present invention.
Figure 3B:
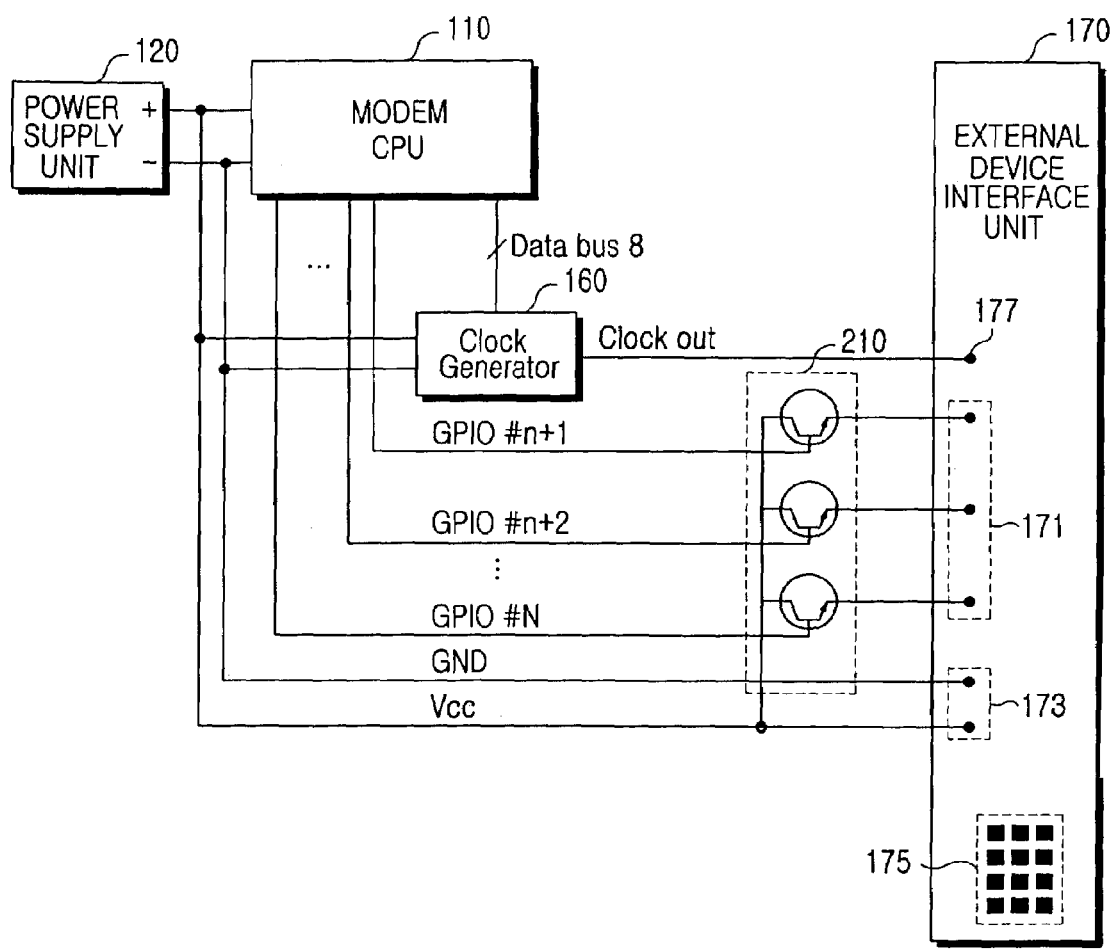
Figure 3C:
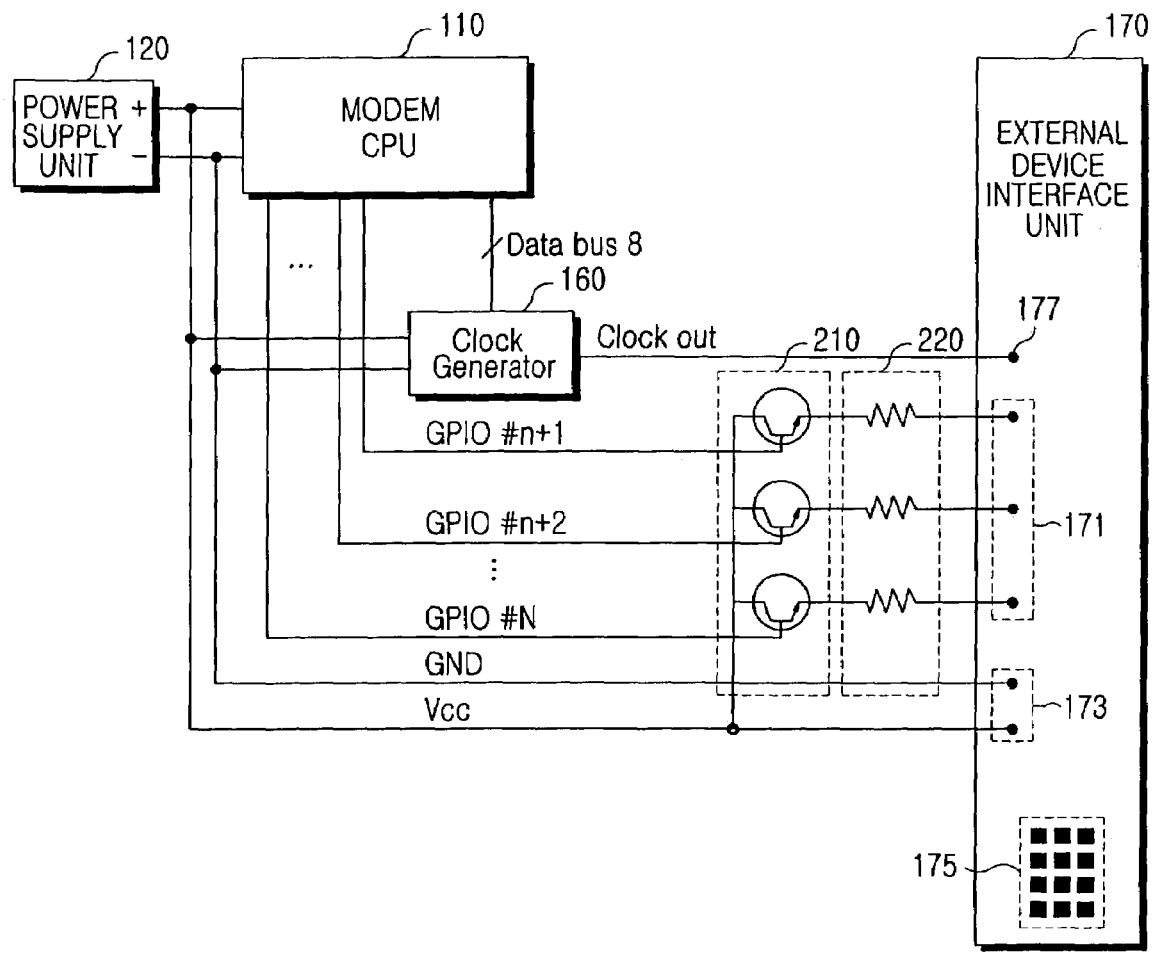

FIGS. 3A to 3C are views showing three possible examples of the external device interface unit 170 according to the present invention. In these figures, it is illustrated that the number of external devices a user can add are limited due to a limited internal power of the portable terminal. In the three examples, a user adds separate LEDs to the portable terminal by means of the external device interface unit, and defines control signals GPIO #n+1~GPIO #N for controlling the operation of the added LEDs.

In the example of FIG. 3A, only the power supply voltage and control signals GPIO #n+1~GPIO #N are provided to be accessible by the user. In detail, the control signals GPIO #n+1~GPIO #N and the power supply voltage are provided inside the portable terminal, and the external device interface unit 170 is only provided with ports connected to the control signals GPIO #n+1~GPIO #N and the power supply voltage. In this case, the user can connect a transistor, an LED, and a resistor to the corresponding ports, while the user can freely alter their configurations. Specifically, when an LED is connected to a rear end of a transistor, the transistor determines whether to apply power supply voltage to the LED based on the control signal (GPIO #N). In such a manner, the user can set the operation rule of the LED connected to the output end of the transistor.

In the example of FIG. 3B, there are further provided transistors 210 inside the portable terminal to be accessible by users. The transistors operate according to the control signals GPIO #n+1~GPIO #N) and the power supply voltage. The external device interface unit 170 is provided with ports connected to the power supply voltage and the output ends of the transistors 210. In this case, the user can connect LEDs and resistors to the corresponding ports while the user can freely alter their configurations. The user can freely control the brightness, color, and display pattern of the LEDs by adjusting the resistance value of each of the resistors and the brightness of each of the LED.

In the example of FIG. 3C, there are further provided resistors 220 inside the portable terminal to be accessible by users. The resistors are connected to the output ends of the transistors 210 that operate according to the control signals GPIO #n+1~GPIO #N. The external device interface unit 170 is provided with ports connected to the power supply voltage and one sides of the resistors. In this case, the user can alter only the kind of the external device (e.g., LED) to be connected to the corresponding resistor. For example, when an LED as an external device is connected to the resistor, the user can freely alter the color and display pattern of the LED.

However, there is few person who can freely handle transistors. Therefore, it is preferable that, as shown in FIG. 3B, transistors are provided inside the portable terminal, and ports for providing only connections with the output end of the transistors are provided in the external device interface unit 170.

The present invention can also provide the combination of the three examples of FIG. 3A to FIG. 3C. For example, it is possible to provide such a configuration that, for GPIO terminals of GPIO #n+1~GPIO #o, only the power supply voltage and the GPIO signals are provided inside the portable terminal as shown in FIG. 3A, and, for GPIO terminals of GPIO #o+1~GPIO #p, transistors which operate according to the GPIO signals GPIO #o+1~GPIO #(p)) are further provided inside the portable terminal as shown in FIG. 3B, and, for GPIO terminals of GPIO #p+1~GPIO #N, resistors connected to the output ends of the transistors which operate according to the control signals GPIO #p+1~GPIO #N are further provided inside the portable terminal as shown in FIG. 3C, and then each of their extension lines is connected to each of the ports of the external device interface unit 170.

Figure 4:
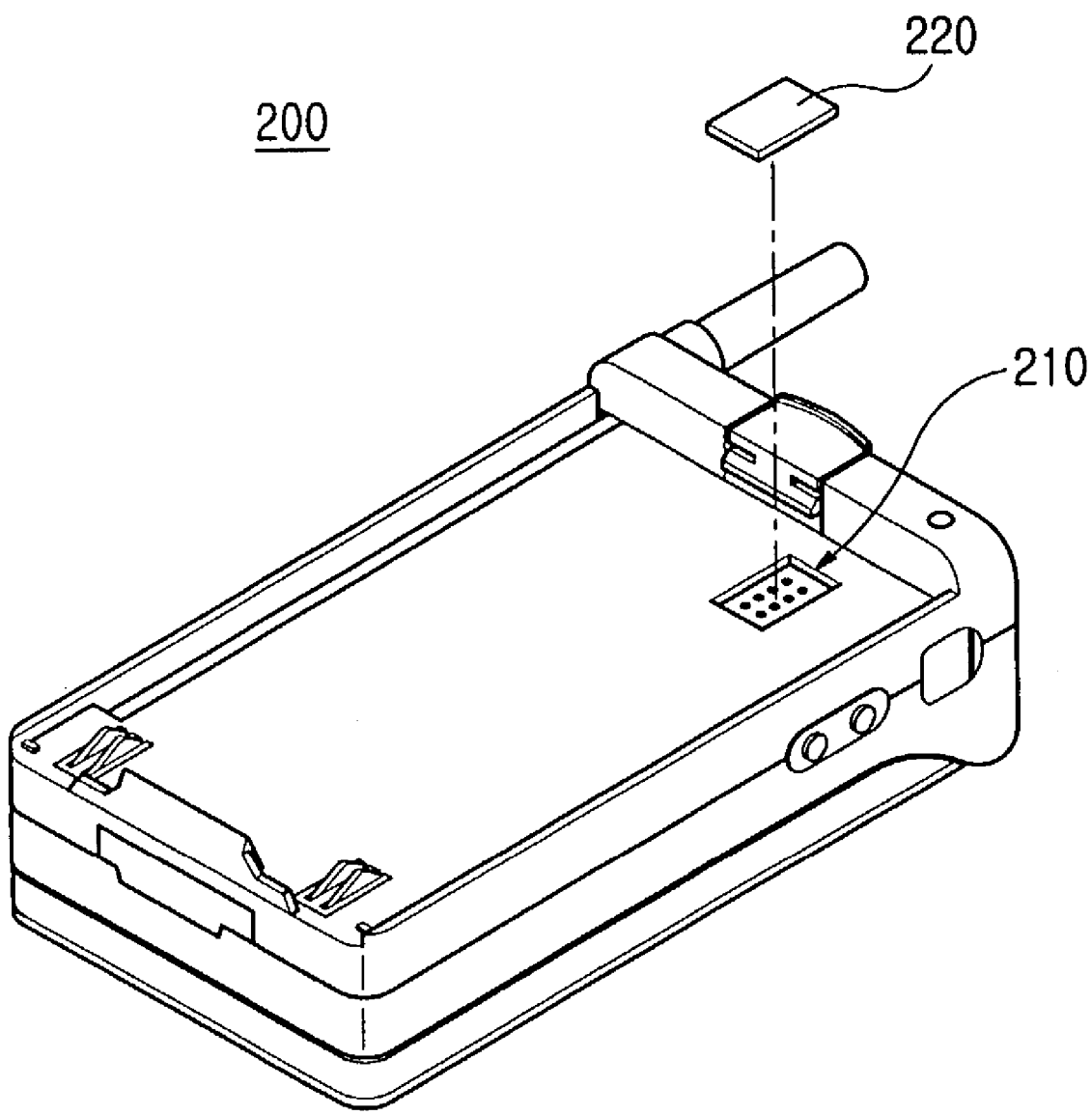
FIG. 4 is an exemplary view showing a portable terminal including a pin for controlling an external device on its rear surface, according to the embodiment of the present invention.

FIG. 4 is an exemplary view showing a portable terminal 200 including a pin for controlling an external device on its rear surface, according to the embodiment of the present invention. As shown in FIG. 4, a pin 210 for controlling the external device, together with its cover 220, is mounted on the rear surface of the portable terminal 200 in the state where a battery is removed from the terminal 200. The pin 210 allows users to freely alter the configuration of the terminal 200. The configuration and the mounting position of the pin 210 may be altered as required. In other words, the pin 210 may have various configurations and be disposed at positions other than as shown in FIG. 4.

Figure 5:
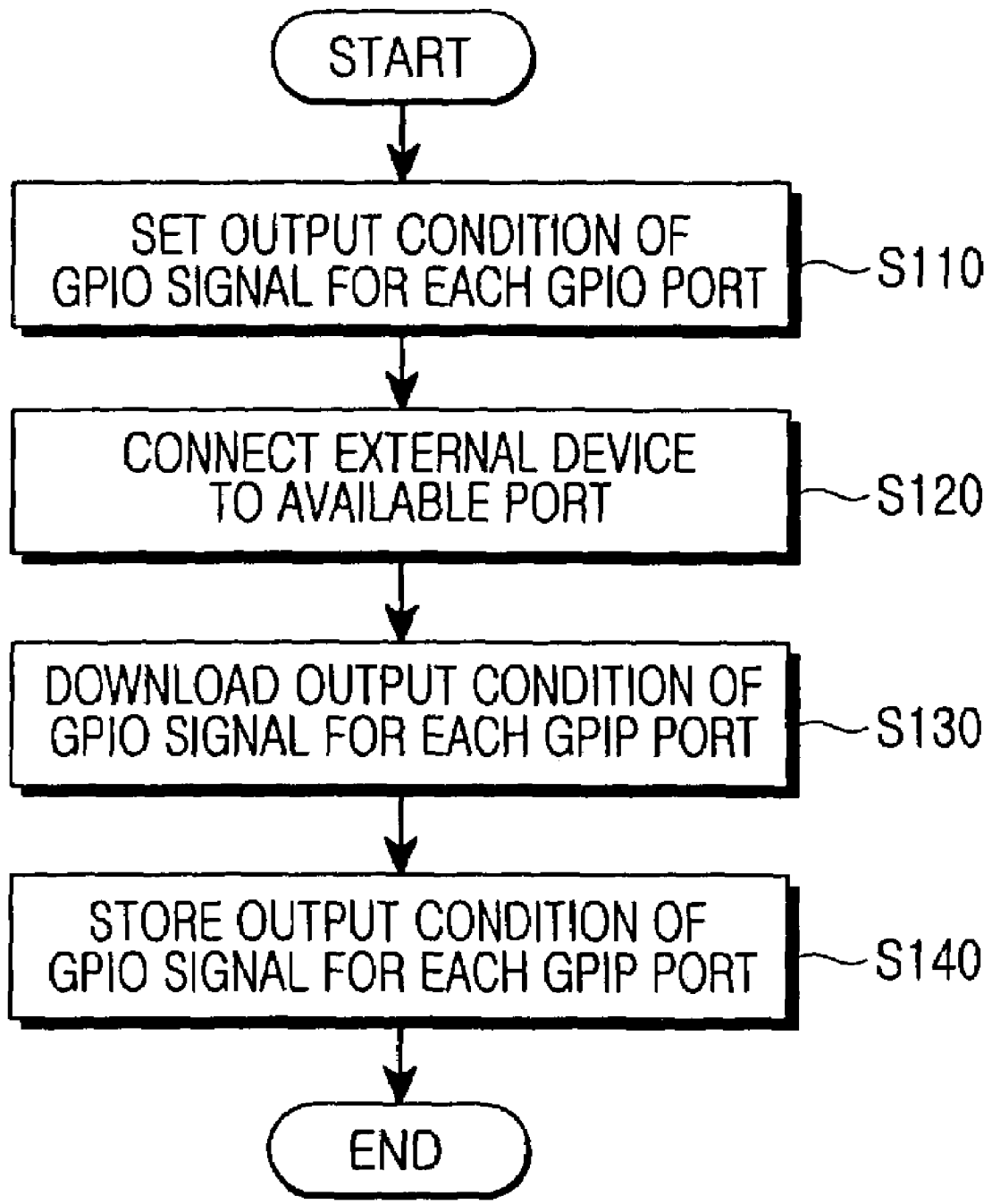
FIG. 5 is a flowchart illustrating the procedure of a method for extending functions of the portable terminal according to the embodiment of the present invention.

FIG. 5 is a flowchart illustrating the procedure of a method for extending functions of the portable terminal according to the embodiment of the present invention. Referring to FIG. 5, when the user wants to alter the configuration of the portable terminal, the user first gains access to a website providing a software tool which allows users to set an output condition of a GPIO signal for each of the GPIO ports. The user defines the operation rule of an external device and corresponding control signals of the external device in step S110. That is, in step S110, the user sets the rule of outputting a GPIO signal for each of the GPIO ports. Subsequently, in step S120, the user connects an external device to a GPIO port available for users in the portable terminal. Thereafter, in steps 130, the user downloads the output condition of the GPIO signal for each GPIO ports set in step S110. Next, the user stores the downloaded output condition of the GPIO signal for each GPIO ports in a user memory region allocated for users in step S140.

The simplest application example of the present invention is as follows. When, upon receipt of a message, a user wants to enable an LED additionally attached to a portable terminal to blink, the user first gains access to a predetermined website and sets its operation rule in step S110. In step S120, the user connects the (+) and (−) terminals of the additionally attached LED to a resistor, and connects one of GPIO ports to a bias terminal of a pnp or npn transistor to provide a GPIO control signal to the transistor. The information on the operation rule set in step S110 is downloaded and stored in a user memory region in steps S130 and S140.

As apparent from the above description, the present invention allows users to alter the configuration of a portable terminal in such a manner that ports are provided to be externally exposed so that users can easily add desired functions to the portable terminal through the ports without disassembling the portable terminal. Particularly, the present invention has an advantage in that users can easily add a desired number of devices such as LEDs and lamps which require a power supply voltage, a clock and a control port. Accordingly, the user can use a number of external devices, equal to the number of ports of a portable terminal accessible by users, by easily connecting the external devices to the ports.

Thus, the present invention can satisfy the user's desires for convenience and uniqueness of portable terminals, thereby producing a new market sector of increasing the use of the terminals.

Although the preferred embodiments of the present invention have been disclosed for illustrative purposes, those skilled in the art will appreciate that various modifications, additions and substitutions are possible, without departing from the scope and spirit of the invention. Accordingly, the scope of the present invention should not be limited to the description of the embodiment, but defined by the accompanying claims as well as equivalents thereof.

What is claimed is:

1. A portable terminal comprising:
an external device interface unit for providing a connection between the portable terminal and an external device, having ports for outputting control signals and electric power for operating the external device, and for controlling an operation of the external device;
a memory unit for storing information for operating the external device, the information being downloaded from an external site;
a main controller for generating an external device control signal based on the operation information stored in the memory unit, and transmitting the external device control signal to the external device interface unit; and
a power supply unit for providing power for driving the external device through the external device interface unit, wherein the external device interface unit includes a pad portion for mounting a plurality of external devices.

2. The portable terminal as set forth in claim 1, wherein the external device interface unit includes:

a control port for outputting a control signal for controlling the operation of the external device; and a power supply port connected to the pad portion and the power supply unit to supply electric power to the external device.

3. The portable terminal as set forth in claim 2, wherein the external device interface unit is configured such that a ground of the power supply unit is connected to a ground of an external power supply unit connected to the external device interface unit through the pad portion, so as to provide an electric power from the external power supply unit to the external device.

4. The portable terminal as set forth in claim 1, further comprising a clock generator for generating a clock signal to be provided to the external device under control of the main controller.

5. The portable terminal as set forth in claim 4, wherein the external device interface unit includes:

a control port for outputting a control signal for controlling the operation of the external device;

a power supply port connected to the pad portion and the power supply unit to supply electric power to the external device; and a clock port connected to the clock generator in order to provide the clock signal to the external device.

6. The portable terminal as set forth in claim 5, wherein the external device interface unit is configured such that a ground of the power supply unit is connected to a ground of an external power supply unit connected to the external device interface unit through the pad portion, so as to provide an electric power from the external power supply unit to the external device.

7. A portable terminal comprising:

an external device interface unit for providing connections between the portable terminal and a plurality of external devices, having ports for outputting control signals and electric power for operating the external devices, and for controlling an operation of each of the external devices;

a memory unit for storing information for operating the external devices, the information being downloaded from an external site;

a main controller for generating a control signal of each of the external devices based on the operation information stored in the memory unit, and transmitting the control signal of each of the external devices to the external device interface unit; and a power supply unit for providing power for driving the external devices through the external device interface unit, wherein the external device interface unit includes a pad portion for mounting a plurality of external devices.

8. The portable terminal as set forth in claim 7, wherein the external device interface unit includes:

a plurality of control ports for outputting control signals for controlling the operation of the plurality of external devices; and a power supply port connected to the pad portion and the power supply unit to supply electric power to the external devices.

9. The portable terminal as set forth in claim 8, wherein the external device interface unit is configured such that a ground of the power supply unit is connected to a ground of an external power supply unit connected to the external device interface unit through the pad portion, so as to provide electric power from the external power supply unit to the external devices.

10. The portable terminal as set forth in claim 7, further comprising a clock generator for generating a clock signal to be provided to the external devices under a control of the main controller.

11. The portable terminal as set forth in claim 10, wherein the external device interface unit includes:

a plurality of control ports for outputting control signals for controlling the operation of the plurality of external devices;

a power supply port connected to the pad portion and the power supply unit to supply electric power to the external devices; and a clock port connected to the clock generator in order to provide the clock signal to the external devices.

12. The portable terminal as set forth in claim 9, wherein the external device interface units configured such that a ground of the power supply unit is connected to a ground of an external power supply unit connected to the external device interface unit through the pad portion, so as to provide an electric power from the external power supply unit to the external devices.

* * * * *